United States Patent
Jang et al.

(10) Patent No.: US 12,217,609 B2
(45) Date of Patent: Feb. 4, 2025

(54) COMMUNICATION SYSTEM FOR PLATOONING VEHICLES

(71) Applicants: Hyundai Motor Company, Seoul (KR); Kia Corporation, Seoul (KR); Korea University Research and Business Foundation, Seoul (KR)

(72) Inventors: Hyun Sung Jang, Suwon-si (KR); Sang Heon Pack, Seoul (KR); Min Ok Kim, Seoul (KR); Joon Woo Kim, Seoul (KR)

(73) Assignees: Hyundai Motor Corporation, Seoul (KR); Kia Corporation, Seoul (KR); Korea University Research and Business Foundation, Seoul (KR)

( * ) Notice: Subject to any disclaimer, the term of this patent is extended or adjusted under 35 U.S.C. 154(b) by 515 days.

(21) Appl. No.: 17/496,551

(22) Filed: Oct. 7, 2021

(65) Prior Publication Data
US 2022/0180754 A1    Jun. 9, 2022

(30) Foreign Application Priority Data
Dec. 4, 2020 (KR) .................. 10-2020-0167933

(51) Int. Cl.
*G08G 1/00* (2006.01)
*G05D 1/00* (2006.01)
(Continued)

(52) U.S. Cl.
CPC ............. *G08G 1/22* (2013.01); *G05D 1/0278* (2013.01); *G05D 1/0293* (2013.01);
(Continued)

(58) Field of Classification Search
None
See application file for complete search history.

(56) References Cited

U.S. PATENT DOCUMENTS

| | | | | |
|---|---|---|---|---|
| 8,081,573 B2 * | 12/2011 | Shackleton | .............. | G08G 1/22 370/312 |
| 2013/0211624 A1 * | 8/2013 | Lind | ........................ | G08G 1/22 701/2 |

(Continued)

FOREIGN PATENT DOCUMENTS

| | | |
|---|---|---|
| DE | 102019208038 A1 * | 12/2020 |
| KR | 20160082614 A | 7/2016 |

(Continued)

OTHER PUBLICATIONS

Machine translation of DE-102019208038-A1 (Year: 2020).*
Machine translation of KR 20190048305 A (Year: 2019).*
Machine translation of KR 102157084 B1 (Year: 2020).*

*Primary Examiner* — Amelia Vorce
*Assistant Examiner* — Kyle S Park
(74) *Attorney, Agent, or Firm* — Slater Matsil, LLP (57) ABSTRACT

An embodiment controller for use in a communication system for platooning vehicles that performs Vehicle-to-Vehicle (V2V) communication through controllers mounted in the platooning vehicles includes a communication unit configured to transmit and receive a message including control and sensor information of the platooning vehicles, a scheduler configured to store message transmission times of the platooning vehicles, and a determiner configured to determine whether a message received through the communication unit corresponds to schedule information stored in the scheduler, wherein the controller is configured to transmit a message in accordance with an order determined based on the schedule information and find out a message transmission order of the platooning vehicles by sharing the schedule information.

20 Claims, 4 Drawing Sheets

(51) Int. Cl.
*G05D 1/02* (2020.01)
*H04L 1/00* (2006.01)
*H04W 4/44* (2018.01)
*H04W 4/46* (2018.01)

(52) U.S. Cl.
CPC ......... *G05D 1/0295* (2013.01); *H04L 1/0027* (2013.01); *H04L 1/0078* (2013.01); *H04W 4/44* (2018.02); *H04W 4/46* (2018.02)

(56) References Cited

U.S. PATENT DOCUMENTS

| | | | |
|---|---|---|---|
| 2018/0084511 A1* | 3/2018 | Wu | H04W 72/20 |
| 2018/0279096 A1* | 9/2018 | Wu | H04W 72/121 |
| 2019/0044728 A1* | 2/2019 | Karmoose | H04L 9/3242 |
| 2019/0245647 A1* | 8/2019 | Alieiev | H04L 1/0017 |
| 2021/0134159 A1* | 5/2021 | Cao | G08G 1/092 |
| 2021/0335134 A1* | 10/2021 | Park | B60W 30/16 |
| 2021/0398432 A1* | 12/2021 | Bae | G05D 1/02 |
| 2022/0167209 A1* | 5/2022 | Baek | H04W 28/02 |
| 2022/0327929 A1* | 10/2022 | Hwang | H04W 92/18 |

FOREIGN PATENT DOCUMENTS

| | | | |
|---|---|---|---|
| KR | 20190048305 A | * | 5/2019 |
| KR | 102157084 B1 | * | 9/2020 |

* cited by examiner

LOST/ERROR OF MESSAGE TRANSMITTED BY $\nu_3$

COMMUNICATION SYSTEM FOR PLATOONING VEHICLES

CROSS-REFERENCE TO RELATED APPLICATIONS

The present application claims the benefit of Korean Patent Application No. 10-2020-0167933, filed Dec. 4, 2020, which application is hereby incorporated herein by reference.

TECHNICAL FIELD

The present disclosure relates to a communication system for platooning vehicles.

BACKGROUND

Platooning of large trucks, which is a kind of autonomous driving of several freight cars being driven in a line, is expected not only to renovate the future distribution industry, but to remarkably reduce large traffic accidents. Platooning has been known to minimize the air resistance applied to following trucks and provide high eco-friendly effect by increasing fuel efficiency and reducing exhaust gas. Since platooning vehicles are cooperatively driven while sharing in real-time vehicle control information, such as acceleration and deceleration, and information collected by various sensors in the vehicles through Vehicle-to-Vehicle (V2V) communication, reliability of communication and real-time effectiveness of information are very important.

However, since there is no mechanism that can check whether a message has been successfully transmitted in existing communication methods, reliability of communication cannot be secured. Further, according to the method of transmitting messages only with a fixed period, when a message transmitted from one vehicle is lost or has an error, the other vehicles cannot recognize the information about the vehicle for at least one period, so real-time effectiveness of information cannot be secured. In the related art, as a method for improving reliability of communication, a method of making each vehicle transmit information in a packet by adding the information about all other vehicles, which the subject vehicle currently has, to the information about the subject vehicle is used. However, there is a problem that an additional memory is required to enable each vehicle to keep the information about all other vehicles, and the larger the size of a message, the higher the possibility of an error in message transmission and the longer the time that is taken to transmit a message.

SUMMARY

The present disclosure relates to a communication system for platooning vehicles. Particular embodiments relate to a communication system for platooning vehicles that is able to improve real-time effectiveness of information by finding out in real time a loss or an error of messages that are transmitted among platooning vehicles.

An embodiment of the present disclosure provides a communication system for platooning vehicles, the communication system being able to improve real-time effectiveness of information by finding out in real time a loss or an error of messages that are transmitted among platooning vehicles.

Another embodiment of the present disclosure provides a communication system for platooning vehicles, the communication system enabling all platooning vehicles to share information for platooning while not requiring excessive memories to the vehicles.

Another embodiment of the present disclosure provides a communication system for platooning vehicles, the communication system not requiring a specific logic for finding out a vehicle with an error in message transmission and the communication system being able to prevent delay of an information update of platooning vehicles after an error is generated in a message transmission.

Embodiments of the present disclosure provide a communication system for platooning vehicles. The communication system for platooning vehicles performs Vehicle-to-Vehicle (V2V) communication through controllers mounted in the platooning vehicles, in which the controllers each include a communication unit transmitting and receiving a message including control and sensor information of the platooning vehicles, a scheduler storing message transmission times of the platooning vehicles, and a determiner determining whether a message received through the communication unit corresponds to schedule information stored in the scheduler, and the controllers each transmit a message in accordance with an order determined on the basis of the schedule information and find out a message transmission order of the platooning vehicles by sharing the schedule information.

According to an embodiment, the communication system may further include a time measurer measuring a current time synchronized among the platooning vehicles on the basis of a time synchronized with a GPS signal.

According to an embodiment, the communication unit may sequentially transmit messages by matching a current time measured by the time measurer with the schedule information, and the time measurer may measure a time when a message is received by the communication unit.

According to an embodiment, the communication system may further include a platooning vehicle information collector storing information about the platooning vehicles and determining a change in the platooning vehicles.

According to an embodiment, when a new vehicle joins platooning or an existing vehicle separates from the platooning, the platooning vehicle information collector may transmit information about the vehicles in a new platoon to the scheduler.

According to an embodiment, the platooning vehicle information collector that finds out that a change is generated in the platooning vehicles may be a part of a master controller mounted in a leader vehicle of the platooning vehicles.

When a new vehicle joins platooning, the scheduler of the master controller may set a message transmission order of the new vehicle as the first or the last in one period.

According to an embodiment, the scheduler may determine new schedule information, and the determining new schedule information may include calculating message transmission intervals of the vehicles in the new platoon on the basis of a platooning message period and the number of the vehicles in the new platoon and determining a message transmission order on the basis of a time synchronized among the vehicles in the new platoon.

According to an embodiment, even if the number of platooning vehicles changes, the platooning message period of the platooning vehicles may not change.

According to an embodiment, when an N-th vehicle not matched with the schedule information transmits a message, the determiner may determine that a message from an N-1-th vehicle, which was supposed to transmit a message before the N-th vehicle, is lost or has an error.

According to an embodiment, when the platooning vehicles do not receive a message for a predetermined interval at an order of the N-1-th vehicle to transmit a message, the N-th vehicle that is the next one of the N-1-th vehicle may transmit a message at a time when the N-1-th vehicle was supposed to transmit a message.

According to an embodiment, the N-1-th vehicle may transmit a message at a time when the N-th vehicle was supposed to transmit a message in accordance with the schedule information after the N-th vehicle transmits a message, and the scheduler may update the schedule information on the basis of the fact that the message transmission orders of the N-th vehicle and the N-1-th vehicle have been switched.

According to an embodiment, when a specific vehicle transmitting a message received by the communication is not matched with a message transmission order stored in the schedule information, the determiner may determine that a message from a vehicle corresponding to the order before the specific vehicle is lost or has an error.

According to an embodiment, the message transmission interval of the platooning vehicles may be a value obtained by dividing the platooning message period of the platooning vehicles by the number of the platooning vehicles.

According to an embodiment, transmission intervals of messages that are transmitted by the platooning vehicles may be different from each other.

According to an embodiment, when the platooning vehicles do not receive a message for a predetermined interval at the order of the N-1-th vehicle to transmit a message, a leader vehicle of the platooning vehicles may transmit a message at a time when the N-1-th vehicle was supposed to transmit a message.

According to an embodiment, when the platooning vehicles do not receive a message for a predetermined interval at an order of the N-1-th vehicle to transmit a message, a vehicle that is physically closest to the N-1-th vehicle may transmit a message at a time when the N-1-th vehicle was supposed to transmit a message.

According to an embodiment, a road side unit storing information about the platooning vehicles and determining a change in the platooning vehicles may be provided, and when a new vehicle joins the platooning or an existing vehicle separates from the platooning, the road side unit may transmit new schedule information including a new message transmission interval and a new message transmission order to the vehicles in the new platoon on the basis of the vehicles in the new platoon.

According to an embodiment, the communication unit may transmit a message to the platooning vehicles using a broadcast type.

According to an embodiment of the present disclosure, when a message is not received at a predetermined order, the controllers can recognize in real time which vehicle's message is lost even without a specific control logic for finding out a vehicle that has transmitted a lost/error message. Accordingly, it is possible to secure reliability in communication among platooning vehicles even without a mechanism that can check whether a message has been successfully transmitted.

According to an embodiment of the present disclosure, since an opportunity of being able to transmit a message again is given to a specific vehicle that has transmitted a lost/error message, it is possible to solve the problem that all platooning vehicles cannot share the information about the specific vehicle in a specific period.

BRIEF DESCRIPTION OF THE DRAWINGS

The above and other objectives, features and other advantages of embodiments of the present invention will be more clearly understood from the following detailed description when taken in conjunction with the accompanying drawings, in which.

DETAILED DESCRIPTION OF ILLUSTRATIVE EMBODIMENTS

The advantages and features of embodiments of the present disclosure, and methods of achieving them will be made clear by referring to the exemplary embodiments that will be described hereafter in detail with reference to the accompanying drawings. However, the present disclosure is not limited to the exemplary embodiments described hereafter and may be implemented in various ways, and the exemplary embodiments are provided to complete the description of the present disclosure and let those skilled in the art completely know the scope of the present invention and the present disclosure is defined by claims. Like reference numerals indicate like components throughout the specification.

Terms '~unit', '~er', 'module', etc. used herein mean the units for processing at least one function or operation and may be implemented by hardware, software, or a combination of hardware and software.

Some components are given terms 'first', 'second', etc. for discrimination throughout the specification because they have the same names, but they are not necessarily limited to the order in the following description.

The specification provides examples of the present disclosure. Further, the description provides embodiments of the present disclosure and the present disclosure may be used in other various combinations, changes, and environments. That is, the present disclosure may be changed or modified within the scope of the present disclosure described herein, a range equivalent to the description, and/or within the knowledge or technology in the related art. The embodiments show an optimum state for achieving the spirit of the present disclosure and may be changed in various ways for the detailed application fields and use of the present disclosure. Therefore, the detailed description of the present disclosure is not intended to limit the present disclosure in the embodiments. Further, the claims should be construed as including other embodiments.

Figure 1:
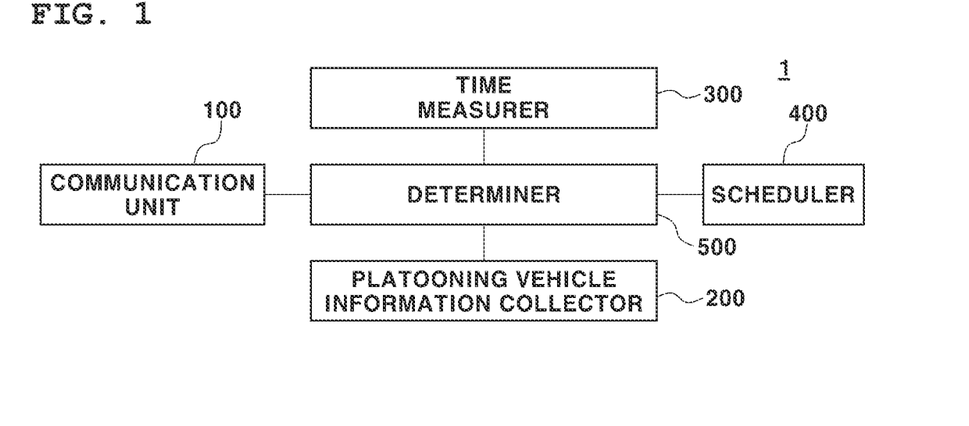
FIG. 1 is a block diagram showing a communication system for platooning vehicles according to an embodiment of the present disclosure.

FIG. 1 is a block diagram showing a communication system for platooning vehicles according to an embodiment of the present disclosure.

Referring to FIG. 1, a controller 1 for implementing a communication system for platooning vehicles may include a communication unit 100, a platooning vehicle information collector 200, a time measurer 300, a scheduler 400, and a determiner 500. The communication unit 100, the platooning vehicle information collector 200, the time measurer 300, and the scheduler 400 may be distinguished in accordance with the functions of the controller 1 mounted in a vehicle for platooning. Platooning may mean cooperatively driving while sharing in real-time vehicle control information, such as acceleration and deceleration, and information collected by various sensors in vehicles through Vehicle-to-Vehicle (V2V) communication. The controller 1, which is a controller for communication among a plurality of platooning vehicles, can transmit and receive messages in real-time such that platooning vehicles can share their states. The controller 1 may be provided for each platooning vehicle. Any one of the platooning vehicles may be defined as a leader vehicle that commands platooning. The controller 1 of the leader vehicle may be defined as a master controller.

The communication unit 100 can transmit and receive messages including control and sensor information of each platooning vehicle. The communication unit 100 transmits a message in a broadcast type and the communication units 100 of all platooning vehicles can receive all the messages that the platooning vehicles transmit. The communication unit 100 can transmit a message at a predetermined time in a predetermined order on the basis of schedule information. For example, the schedule information may be information including the number of platooning vehicles, the traveling order of platooning vehicles, the message transmission intervals of platooning vehicles, the message transmission order of platooning vehicles, etc. The communication unit 100 of the master controller can receive a message requesting joinder or separation from a new vehicle that joins platooning or a vehicle that separates from platooning.

The platooning vehicle information collector 200 can store information about platooning vehicles and determine changes of the platooning vehicles. The platooning vehicle information collector 200 may be applied to the master controller of a leader vehicle of platooning vehicles. That is, the platooning vehicle information collector 200 of the master controller can determine changes of platooning vehicles. However, the controllers 1 other than the master controller each may include the platooning vehicle information collector 200. The platooning vehicle information collector 200 can find out a new vehicle that joins platooning or a vehicle that separates from platooning. In detail, a new vehicle that joins platooning or a vehicle that separates from platooning can transmit a message requesting joinder or separation to the leader vehicle. The platooning vehicle information collector 200 can update information such as the number of platooning vehicles and traveling order of platooning vehicles on the basis of the message requesting joinder or separation that is obtained through the communication unit 100. The new schedule information updated by the platooning vehicle information collector 200 can be transmitted to the scheduler 400.

The time measurer 300 can measure the current time synchronized among platooning vehicles on the basis of time synchronized with a GPS signal. The time measurer 300 can synchronize time on the basis of transmission of messages among a plurality of platooning vehicles. Accordingly, the communication unit 100 can sequentially transmit messages by matching the schedule information with the current time measured by the time measurer 300 and the time measurer 300 can measure and store the time when messages are received by the communication unit 100.

The scheduler 400 can determine new schedule information. For example, when a new vehicle joins platooning or a vehicle separates from platooning, it is possible to determine a new message transmission interval and a new message transmission order on the basis of the number of platooning vehicles and the traveling order of platooning vehicles that are determined by the platooning vehicle information collector 200. In detail, the scheduler 400 can calculate a new message transmission interval of platooning vehicles in consideration of a platooning message period and the new number of platooning vehicles and can determine a message transmission order on the basis of the time newly synchronized among platooning vehicles. Even if the number of platooning vehicles changes, the platooning message period of the platooning vehicles may not change. The message transmission interval of platooning vehicles may be a value obtained by dividing the platooning message period of the platooning vehicles by the number of the platooning vehicles. Accordingly, the larger the number of platooning vehicles, the smaller the message transmission interval of the platooning vehicles may be, and the smaller the number of platooning vehicles, the larger the message transmission interval of the platooning vehicles may be.

The determiner 500 can determine whether there is an error in a message received by the communication unit 100 and can determine whether a received message is the message that was transmitted from a vehicle matched with schedule information. When a specific vehicle that transmitted a message received by the communication unit 100 is not matched with the message transmission order stored in the schedule information, the determiner 500 can determine that a message from a vehicle corresponding to the order before the specific vehicle is lost. When a received message is the message that was transmitted from a vehicle matched with the schedule information, the determiner 500 can determine whether there is an error in the message on the basis of a code that can determine a message error and a logic that determines whether it is effective data. The determiner 500 can control the communication unit 100 to transmit a message on the basis of the schedule information stored in the scheduler 400 or schedule information newly determined by the scheduler 400.

The determiners 500 of platooning vehicles can receive messages in real-time from the platooning vehicles. When a message is not received from a vehicle corresponding to a predetermined order, the next vehicle can transmit first a message on the basis of the schedule information. When a vehicle not corresponding to a predetermined order transmits a message, the determiner 500 can determine that a message from a vehicle, that was supposed to transmit a message before the vehicle not corresponding to the predetermined order, is lost or has an error. That is, the determiner 500, even without a specific logic, can determine in real-time that a message from a vehicle is lost or has an error on the basis of the schedule information shared by platooning vehicles. Further, the controller 1 that has transmitted a lost/error message can find out in real-time that the message is lost or has an error.

The determiner 500 of a vehicle that transmitted a lost/error message after a specific vehicle transmits a message can control the communication unit 100 to transmit again a message. The determiner 500 of the vehicle that transmitted a lost/error message can control the communication unit 100 to transmit a message at the order of a specific vehicle to transmit a message on the basis of the schedule information.

For example, when an N-th vehicle not matched with schedule information transmits a message, the determiner 500 can determine that the message from an N-1-th vehicle, which was supposed to transmit a message before the N-th vehicle, is lost or has an error. When platooning vehicles do not receive a message for a predetermined interval at the order of the N-1-th vehicle to transmit a message, the N-th vehicle that is the next one of the N-1-th vehicle can transmit a message at the time when the N-1-th vehicle is supposed to transmit a message. After the N-th vehicle transmits a message, the N-1-th vehicle can transmit a message at the time when the N-th vehicle was supposed to transmit a message in accordance with schedule information. If the N-1-th vehicle does not transmit a message even at the time when the N-th vehicle is supposed to transmit a message in accordance with the predetermined schedule information, the determiner 500 can determine that there is a problem with the N-1-th vehicle. The logic that determined that there is a problem with a vehicle can be applied when other platooning vehicles do not receive the message transmitted from the N-1-th vehicle at least two or more times. In this case, the scheduler 400 can update the schedule information on the basis of the switch of the message transmission orders of the N-th vehicle and the N-1-th vehicle. The updated schedule information can be transmitted to other platooning vehicles by the communication unit 100 that is controlled by the determiner 500 of the master controller.

According to an embodiment of the present disclosure, each of the controllers 1 of platooning vehicles can transmit a message in accordance with the order determined on the basis of schedule information. The controllers 1 can recognize the message transmission order of the platooning vehicle by sharing schedule information. Accordingly, when a specific vehicle transmits a message not at its order, all platooning vehicles can recognize that the message transmitted by the vehicle corresponding to the order before the specific vehicle is lost or has an error. Further, when a specific vehicle transmits a message not at its order, the controller 1 of the vehicle that has transmitted the lost/error message can recognize that there is a problem with the message transmitted by itself. That is, when a message is not received at a predetermined order, the controllers 1 can recognize in real-time which vehicle's message is lost even without a specific control logic for finding out a vehicle that has transmitted a lost/error message. Accordingly, it is possible to secure reliability in communication among platooning vehicles even without a mechanism that can check whether a message has been successfully transmitted.

Figure 2:
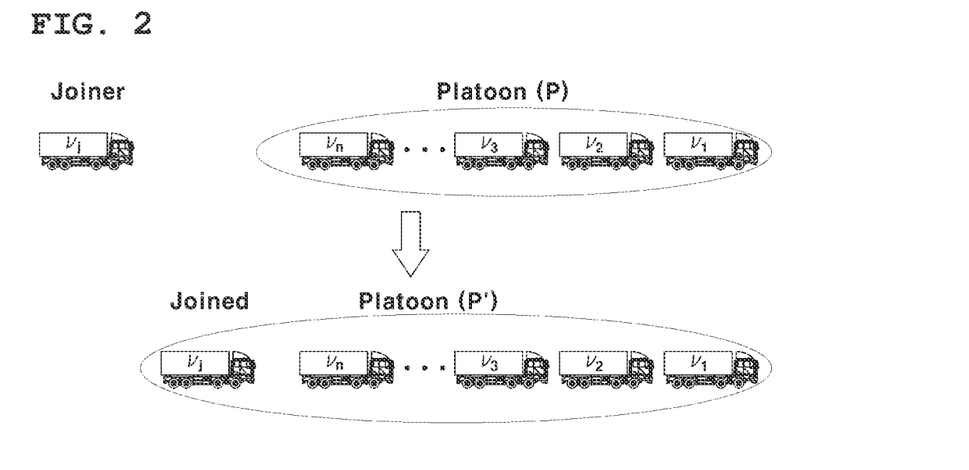
FIG. 2 is a view showing the case in which a new vehicle according to an embodiment of the present disclosure joins platooning.
Figure 3:
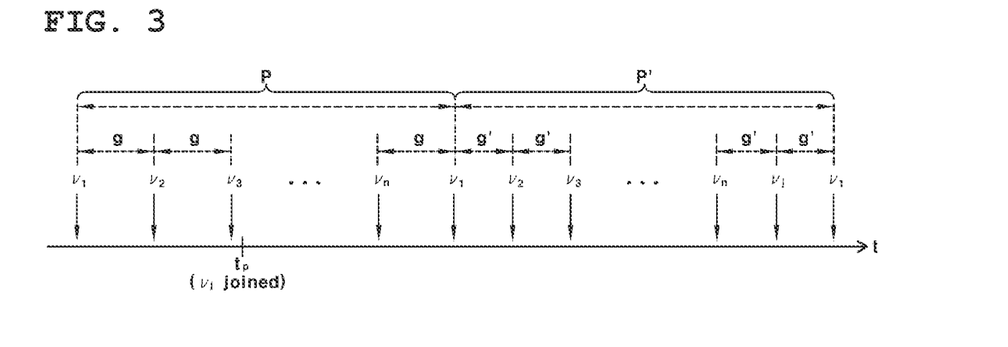
FIG. 3 is a view showing a centralized scheduling according to an embodiment of the present disclosure.

FIG. 2 is a view showing the case in which a new vehicle according to an embodiment of the present disclosure joins platooning and FIG. 3 is a view showing a centralized scheduling according to an embodiment of the present disclosure.

Referring to FIGS. 1 to 3, there may be platooning vehicles $V_1, V_2, V_3, \ldots,$ and $V_n$ and a new vehicle $V_j$ that intends to join the platooning. In this case, the leader vehicle that commands platooning of the platooning vehicles $V_1, V_2,$ $V_3, \ldots,$ and $V_n$ may be the first vehicle $V_1$. That is, the controller 1 of the first vehicle $V_1$ may be a master controller. In this embodiment, the platooning message period may be set as T.

The new vehicle $V_j$ can transmit a message requesting to join to the first vehicle $V_1$. That is, the communication unit 100 of the new vehicle $V_j$ can transmit a message requesting to join. The first vehicle $V_1$ can transmit a message that permits platooning. The platooning vehicle information collector 200 of the first vehicle $V_1$ finds out that the number of platooning vehicles increased by one and can find out the traveling order of the new vehicle $V_j$.

The platooning vehicle information collector 200 of the first vehicle $V_1$ can transmit the information of the changed number of platooning vehicles and the traveling order of the platooning vehicles to the scheduler 400 of the first vehicle $V_1$.

When a new vehicle $V_j$ joins the platooning, the scheduler 400 of the first vehicle $V_1$ can set the message transmission order of the new vehicle $V_j$ as the first or the last in one period. The scheduler 400 can determine new schedule information including the new message transmission interval and the new message transmission order on the basis of the number of the platooning vehicles and the traveling order of the platooning vehicles. For example, a new message transmission interval g' may be smaller than the existing message transmission interval g. However, the platooning message period T may not be changed. For example, the existing message transmission order may be $V_1 \rightarrow V_2 \rightarrow V_3 \rightarrow \ldots \rightarrow V_n$, and after the new vehicle additionally joins the platooning, the master controller performs 'centralized scheduling' and the message transmission order can be changed into $V_1 \rightarrow V_2 \rightarrow V_3 \rightarrow \ldots \rightarrow V_n \rightarrow V_j$ in accordance with the newly scheduled information.

The communication unit 100 of the first vehicle can transmit the newly scheduled information to the vehicles $V_2, V_3, \ldots, V_n,$ and $V_j$ in the new platooning. The new vehicle $V_j$ can join the communication among the platooning vehicle from the next period after it joins the platooning. That is, only the existing platooning vehicles $V_1, V_2, V_3, \ldots,$ and $V_n$ perform communication in the existing period P, and the new platooning vehicles $V_1, V_2, V_3, \ldots, V_n,$ and $V_j$ perform communication in the new period P'.

Figure 4:
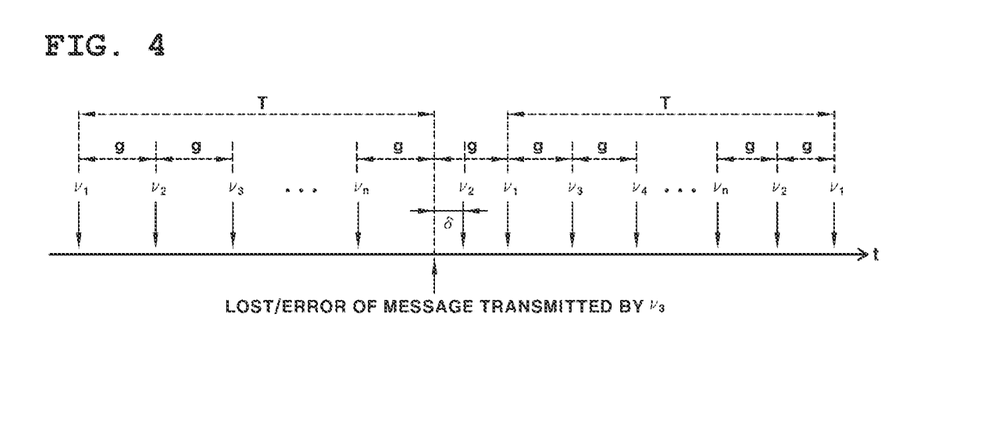
FIG. 4 is a view showing a decentralized scheduling according to an embodiment of the present disclosure.

FIG. 4 is a view showing a decentralized scheduling according to an embodiment of the present disclosure.

Referring to FIGS. 1 and 4, the message transmission order of platooning vehicles $V_1, V_2, V_3, \ldots,$ and $V_n$ is $V_1 \rightarrow V_2 \rightarrow V_3 \rightarrow \ldots \rightarrow V_n$. The decentralized scheduling described in this embodiment may be a scheduling method for correcting a loss/error of a message when the message of any one vehicle is lost or an error is generated in the message of any one vehicle.

The message transmitted by the first vehicle may be lost or an error may be generated in the message in communication of the existing platooning vehicles $V_1, V_2, V_3, \ldots,$ and $V_n$. When the second vehicle $V_2$ that is the next one does not receive the message from the first vehicle $V_1$ at a predetermined time or when there is an error in the message transmitted to the second vehicle $V_2$ from the first vehicle $V_1$, the second vehicle $V_2$ can transmit a message after a predetermined interval δ passes. Since the second vehicle $V_2$ transmits a message after a predetermined interval δ passes rather than the predetermined message transmission interval, the other platooning vehicles $V_1, V_3, \ldots,$ and $V_n$ can recognize in real-time that the message from the first vehicle $V_1$ is lost or has an error.

On the basis of the schedule information, the first vehicle $V_1$ that is the previous vehicle can transmit a message again at the time when the second vehicle $V_2$ was supposed to transmit a message. That is, even though the other vehicles $V_1, V_3, \ldots$, and $V_n$ do not request the first vehicle $V_1$ to transmit a message again, the first vehicle $V_1$ transmits a message at the time when the second vehicle $V_2$ was supposed to transmit a message. The schedulers 400 of the controllers 1 of the vehicles recognize that the message transmission order of the first vehicle $V_1$ and the second vehicle $V_2$ has been switched, and can determine new scheduling information in accordance with the changed order. The new schedule information determined by the schedulers 400 of the vehicles can be shared. Accordingly, the message transmission order of the platooning vehicles $V_1, V_2, V_3, \ldots$, and $V_n$ can be changed into $V_2 \rightarrow V_1 \rightarrow V_3 \rightarrow \ldots \rightarrow V_n$ in the next period.

If messages are transmitted only in accordance with a fixed order, when the message transmitted from a specific vehicle is lost or has an error, the other platooning vehicles cannot recognize the information about the specific vehicle for at least one period, so real-time effectiveness of information cannot be secured. However, according to an embodiment of the present disclosure, since an opportunity of being able to transmit a message again is given to a specific vehicle that has transmitted a lost/error message, it is possible to solve the problem that all platooning vehicles cannot share the information about the specific vehicle in a specific period.

Figure 5:
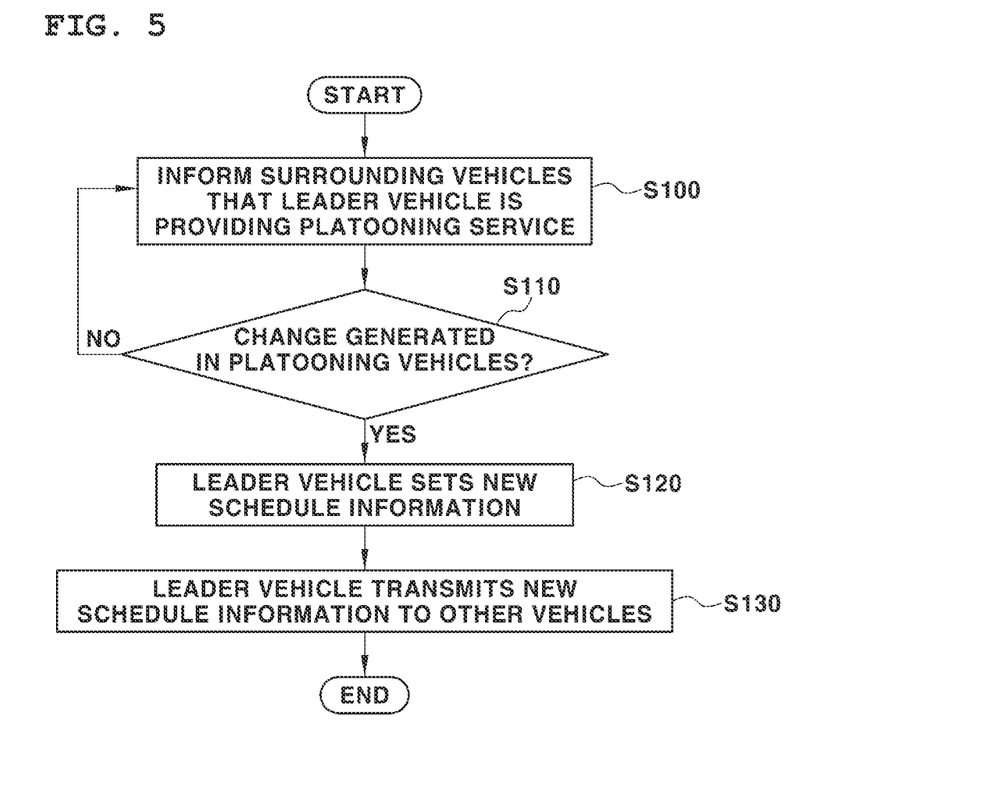
FIG. 5 is a flowchart showing the centralized scheduling according to an embodiment of the present disclosure.

FIG. 5 is a flowchart showing the centralized scheduling according to an embodiment of the present disclosure. Centralized scheduling by the master controller of a leader vehicle is described in this embodiment. Repeated description is not provided for brief description.

Referring to FIGS. 1 and 5, it can be seen that a leader vehicle provides a platooning service to surrounding vehicles. In detail, the communication unit 100 of the master controller of a leader vehicle can output an informing message saying that a platooning service is being provided (S100).

The platooning vehicle information collector 200 can store information about platooning vehicles and determine changes of the platooning vehicles. The platooning vehicle information collector 200 can determine changes of platooning vehicles. In detail, when a new vehicle joins platooning or an existing vehicle separates from platooning, the platooning vehicle information collector 200 can determine the number of vehicles that keep platooning and the traveling order of the vehicles (S110).

It is possible to set new schedule information on the basis of the number of vehicles that keep platooning. The scheduler 400 can determine a new message transmission interval and a new message transmission order on the basis of the number of the vehicles that keep platooning. In detail, the scheduler 400 can calculate a new message transmission interval of platooning vehicles in consideration of a platooning message cycle and the new number of platooning vehicles and can determine a message transmission sequence on the basis of the time newly synchronized among platooning vehicles. Even if the number of platooning vehicles changes, the platooning message cycle of the platooning vehicles may not change (S120).

The determiner 500 can transmit the schedule information newly determined by the scheduler 400 to other platooning vehicles. That is, the leader vehicle can transmit the new schedule information to the other platooning vehicles. Accordingly, the platooning vehicles receive messages on the basis of the new schedule information (S130).

Figure 6:
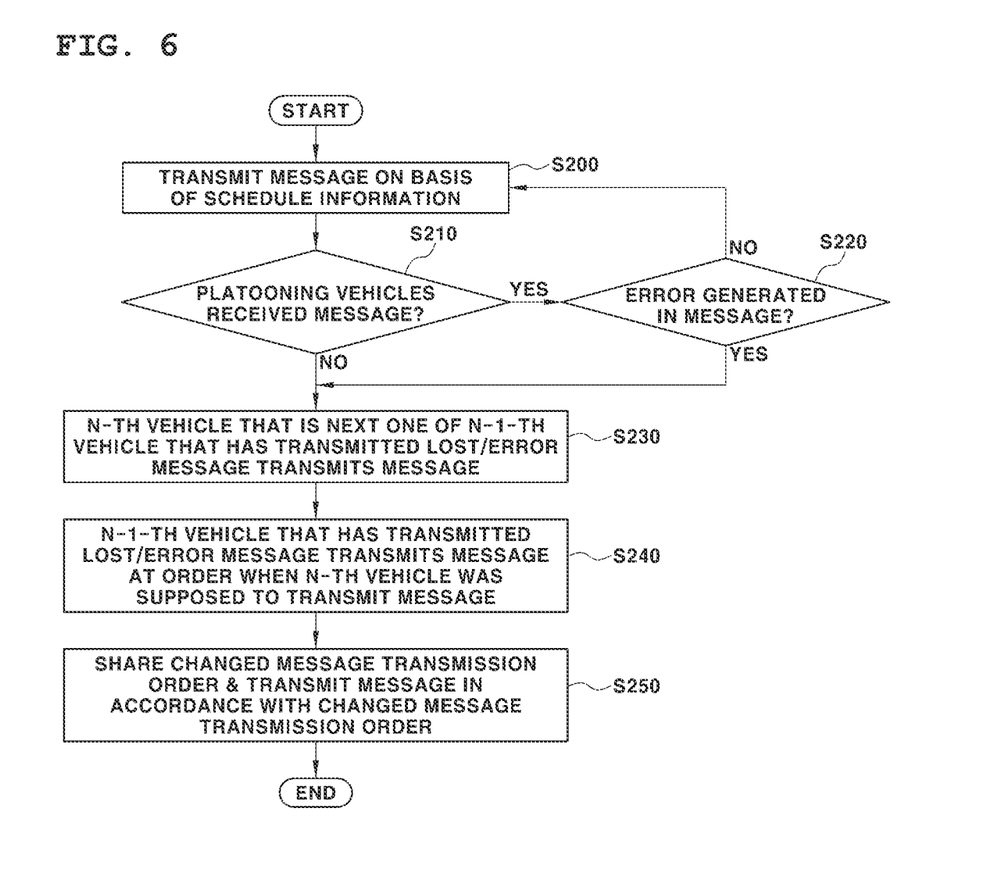
FIG. 6 is a flowchart showing the decentralized scheduling according to an embodiment of the present disclosure.

FIG. 6 is a flowchart showing the decentralized scheduling according to an embodiment of the present disclosure. Decentralized scheduling by the controller in each of platooning vehicles is described in this embodiment. Repeated description is not provided for brief description.

Referring to FIGS. 1 and 6, the determiner 500 can control the communication unit 100 to transmit a message on the basis of the schedule information set by the scheduler 400 (S200).

The time measurer 300 can determine whether a message has been received at a predetermined time and the determiner 500 can determine whether a message has been transmitted from a vehicle matched with the schedule information (S210).

When the platooning vehicles receive a message at a predetermined time, the determiner 500 can determine whether there is an error in the received message using an error detection algorithm (S220). When there is no error in the received message (No at S220), the platooning vehicles can transmit and receive messages on the basis of the originally determined schedule information (S200).

When the platooning vehicles do not receive a message for a predetermined interval at a predetermined time (No at S210), the determiner 500 can determine that the message is lost. For example, when platooning vehicles do not receive a message for a predetermined interval at the order of an N-1-th vehicle to transmit a message, the platooning vehicles can determine that the message transmitted by the N-1-th vehicle is lost. When the platooning vehicles have received the message from the N-1-th vehicle but there is an error in the received message (Yes at S210), the platooning vehicles can determine that there is an error in the message transmitted by the N-1-th vehicle (Yes at S220). When platooning vehicles do not receive a message for a predetermined interval at the order of the N-1-th vehicle to transmit a message, the N-th vehicle that is the next one of the N-1-th vehicle can transmit a message at the time when the N-1-th vehicle is supposed to transmit a message. According to the existing schedule information, it is assumed that the N-th vehicle is set to transmit a message after the N-1-th vehicle transmits a message (S230).

After the N-th vehicle transmits a message, the N-1-th vehicle, which transmitted the lost/error message, can transmit a message at the time when the N-th vehicle was supposed to transmit a message in accordance with schedule information. That is, the times when the N-1-th vehicle and the N-th vehicle transmit a message can be switched. Accordingly, it is possible to solve the problem that when the message from any specific vehicle is lost or has an error, the message from the specific vehicle is not shared among vehicles for one period (S240).

The scheduler 400 can determine new schedule information on the basis of the switching of the times to transmit messages. The scheduler 400 can share the changed message transmission order with other platooning vehicles. Accordingly, the platooning vehicles can transmit and receive messages in accordance with the changed message transmission order (i.e., the new schedule information) (S250).

Figure 7:
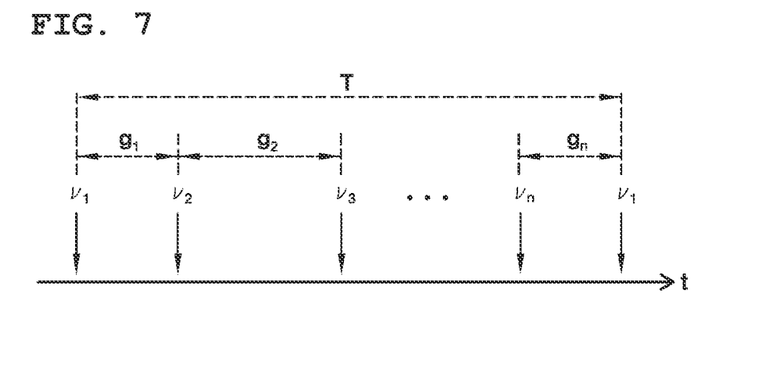
FIG. 7 is a view showing a modified example of a message transmission interval among platooning vehicles according to an embodiment of the present disclosure.

FIG. 7 is a view showing a modified example of a message transmission interval among platooning vehicles according to an embodiment of the present disclosure.

Referring to FIG. 7, the message transmission intervals of platooning vehicles $V_1, V_2, V_3, \ldots$, and $V_n$ may be different. For example, the interval between the time for the first vehicle $V_1$ to transmit a message and the time for the second vehicle $V_2$ to transmit a message may be a first transmission interval g1, the interval between the time for the second vehicle $V_2$ to transmit a message and the time for the third vehicle $V_3$ to transmit a message may be a first transmission interval g2, in which the first transmission interval g1 and the second transmission interval g2 may be different from each other. However, the platooning message period until the first vehicle $V_1$ transmits a message again after transmitting a message may be set as T. The transmission intervals for messages may be adaptively set in accordance with the physical distances among the platooning vehicles $V_1, V_2, V_3, \ldots$, and $V_n$.

Figure 8:
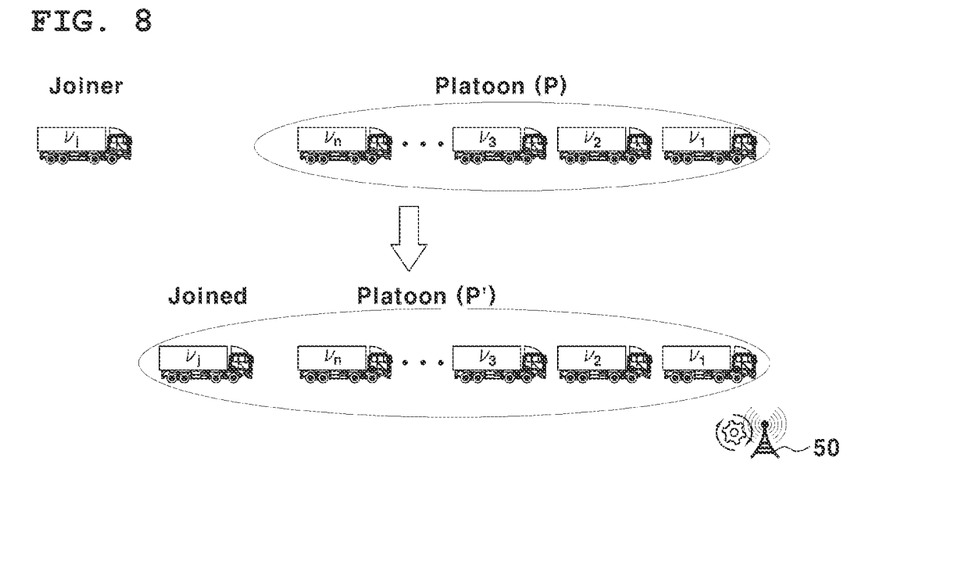
FIG. 8 is a view showing a modified example of the centralized scheduling according to an embodiment of the present disclosure.

FIG. 8 is a view showing a modified example of the centralized scheduling according to an embodiment of the present disclosure.

Referring to FIG. 8, when the number of platooning vehicles in a platoon changes, schedule information in which message transmission times of the platooning vehicles is newly set can be transmitted from a vehicle having the most CPU resources left, a vehicle having the least communication interruption factors due to obstacles and the distances from other vehicles, or the edge computer or a cloud server of a road side unit 50 closest to the platoon. That is, not only the leader vehicle of the platooning vehicles transmits new schedule information to other vehicles for sharing, but the subject that transmits new schedule information to other vehicles is changed, depending on various driving situation.

For example, a road side unit 50 that stores information about platooning vehicles and determines a change in the platooning vehicles may be provided. When a new vehicle joins platooning or an existing vehicle separates from the platooning, the road side unit 50 can transmit new schedule information including a new message transmission interval and a new message transmission order to the vehicles in the new platoon on the basis of the vehicles in the new platoon. The road side units 50 may be disposed with predetermined gaps around the road on which the platooning vehicles are driven.

Figure 9:
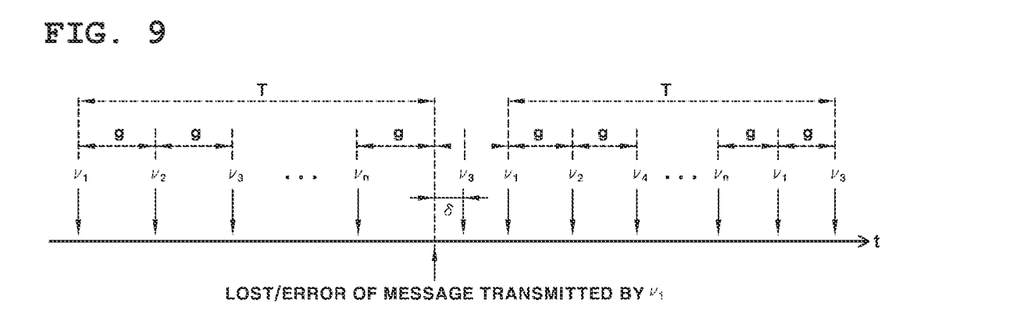
FIG. 9 is a view showing a modified example of the decentralized scheduling according to an embodiment of the present disclosure.

FIG. 9 is a view showing a modified example of the decentralized scheduling according to an embodiment of the present disclosure.

Referring to FIG. 9, when a message is lost or has an error, a vehicle has the lowest possibility of a communication error due to radio interruption in comparison to other vehicles because it is physically closest to the vehicle that has transmitted the lost/error message, a leader vehicle that manages the entire platooning, or a vehicle designated to take charge of an error generation event transmits a message at a time different from the message transmission time thereof set in schedule information, thereby it is possible to inform other vehicle that the message is lost or has an error.

For example, when platooning vehicles $V_1, V_2, V_3, \ldots$, and $V_n$ do not receive a message for a predetermined interval at the order of a first vehicle $V_1$ to transmit a message, a third vehicle $V_3$, which is the vehicle designated in advance to take charge of an error generation event of the platooning vehicles $V_1, V_2, V_3, \ldots$, and $V_n$, may transmit a message first. That is, when the first vehicle $V_1$ does not transmit a message at the order of the first vehicle $V_1$ to transmit a message, the third vehicle can transmit a message at the time when the first vehicle $V_1$ was supposed to transmit a message. In this case, the first vehicle $V_1$ can immediately transmit a message at the next order. That is, the third vehicle $V_3$, the first vehicle $V_1$, and the second vehicle $V_2$ can sequentially transmit messages.

As another example, when platooning vehicles $V_1, V_2, V_3, \ldots$, and $V_n$ do not receive a message for a predetermined interval at the order of the first vehicle $V_1$ to transmit a message, a vehicle (the third vehicle $V_3$ in this embodiment) that is physically closest to the first vehicle $V_1$ can transmit a message at the time when the first vehicle $V_1$ was supposed to transmit a message.

Unlikely, when the third vehicle $V_3$ transmits a message at the time when the first vehicle $V_1$ was supposed to transmit a message, the second vehicle $V_2$ may transmit a message on the basis of the original schedule information. In this case, the first vehicle $V_1$ can transmit a message at the order of the third vehicle $V_3$ to transmit a message. Consequently, the third vehicle $V_3$, the second vehicle $V_2$, and the first vehicle $V_1$ can sequentially transmit messages.

Although exemplary embodiments of the present disclosure were described above with reference to the accompanying drawings, those skilled in the art would understand that the present disclosure may be implemented in various ways without changing the necessary features or the spirit of the present disclosure. Therefore, the embodiments described above are only examples and should not be construed as being limitative in all respects.

What is claimed is:

1. A communication system for platooning vehicles that performs Vehicle-to-Vehicle (V2V) communication through a plurality of controllers mounted in the platooning vehicles, the communication system comprising:
the plurality of controllers, each comprising a respective communication unit configured to transmit and receive platooning vehicle messages comprising control and sensor information of the platooning vehicles, wherein:
each controller of the plurality of controllers is configured to:
obtain and store schedule information comprising a message transmission order and planned message transmission times for the platooning vehicles, and
a first controller of the plurality of controllers that is mounted in a first platooning vehicle of the platooning vehicles is configured to:
transmit first platooning vehicle messages from the first platooning vehicle based on the schedule information;
store received message transmission times of received messages from other platooning vehicles of the platooning vehicles; and
determine whether a particular message of the received messages corresponds to the message transmission order of the schedule information,
wherein when the particular message is received from an N-th vehicle of the platooning vehicles that is not matched with the message transmission order, the first controller is configured to determine that an additional message from an N-1-th vehicle of the platooning vehicles, which was supposed to transmit the additional message before the N-th vehicle, is lost or has an error, and
wherein, when the platooning vehicles do not receive the additional message for a predetermined interval at an order of the message transmission order for the N-1-th vehicle to transmit the additional message, a second controller of the plurality of controllers mounted in the N-th vehicle, which is a next vehicle after the N-1-th vehicle in the message transmission order, is configured to transmit the particular message when the N-1-th vehicle was configured to transmit the additional message according to the message transmission order.

2. The communication system of claim 1, wherein each controller of the plurality of controllers is further configured to:
measure a current time synchronized among the platooning vehicles based on a time synchronized with a GPS signal.

3. The communication system of claim 2, wherein:
each of the respective communication units is further configured to sequentially transmit a portion of the platooning vehicle messages by matching the current time measured by the controller with the schedule information; and
each controller of the plurality of controllers is further configured to measure times when the platooning vehicle messages from other platooning vehicles are received.

4. The communication system of claim 1, wherein each platooning vehicle message of the platooning vehicle messages is transmitted from one platooning vehicle of the platooning vehicles to other platooning vehicles of the platooning vehicles using a broadcast type.

5. The communication system of claim 1, wherein a message transmission interval of the platooning vehicles is a value obtained by dividing a platooning message period of the platooning vehicles by a number of the platooning vehicles.

6. The communication system of claim 1, wherein transmission intervals of messages transmitted by the platooning vehicles are different from each other.

7. The communication system of claim 1, wherein:
the N-1-th vehicle is configured to re-transmit the additional message at a time when the N-th vehicle was supposed to transmit the particular message in accordance with the schedule information after the N-th vehicle transmits the particular message; and
each controller is configured to update the schedule information based on a switch in message transmission orders of the N-th vehicle and the N-1-th vehicle.

8. The communication system of claim 1, further comprising:
a road side unit configured to store information about the platooning vehicles and determine a change in the platooning vehicles.

9. The communication system of claim 8, wherein, when a new vehicle joins the platooning vehicles or an existing vehicle of the platooning vehicles separates from the platooning vehicles to form a new platoon, the road side unit is configured to transmit new schedule information including a new message transmission interval and a new message transmission order to vehicles in the new platoon based on the vehicles in the new platoon.

10. The communication system of claim 1,
wherein each controller is further configured to store information about the platooning vehicles and determine a change in the platooning vehicles.

11. The communication system of claim 10, wherein, when a new vehicle joins the platooning vehicles or an existing vehicle separates from the platooning vehicles forming a new platoon, each controller is further configured to store information about vehicles in the new platoon.

12. The communication system of claim 11, wherein:
a master controller of the plurality of controllers is configured to determine that the change is generated in the platooning vehicles, and
the master controller is mounted in a leader vehicle of the platooning vehicles.

13. The communication system of claim 12, wherein, when the new vehicle joins the platooning vehicles, the master controller is further configured to set a message transmission order position of the new vehicle as first or last in one period.

14. The communication system of claim 11, wherein each controller is further configured to determine new schedule information by calculating message transmission intervals of the vehicles in the new platoon based on a platooning message period and a number of the vehicles in the new platoon and by determining a message transmission order based on a time synchronized among the vehicles in the new platoon.

15. The communication system of claim 14, wherein the platooning message period of the platooning vehicles does not change even if a number of the platooning vehicles changes.

16. A communication system for platooning vehicles that performs Vehicle-to-Vehicle (V2V) communication through controllers mounted in the platooning vehicles, the communication system comprising:
the controllers, each comprising respective communication units, mounted in the platooning vehicles, wherein:
each of the respective communication units is configured to transmit and receive platooning vehicle messages comprising control and sensor information of the platooning vehicles, and
each of the controllers is configured to:
obtain and store schedule information comprising a message transmission order and planned message transmission times for the platooning vehicles;
transmit first platooning vehicle messages corresponding to a first platooning vehicle based on the schedule information; and
store received message transmission times of received messages from other platooning vehicles of the platooning vehicles; and
a first controller of the controllers is configured to:
determine whether a particular message of the received messages corresponds to the message transmission order of the schedule information;
wherein:
when the platooning vehicles do not receive an additional message for a predetermined interval at an order of an N-1-th vehicle to transmit the additional message, a different vehicle of the platooning vehicles is configured to transmit the particular message when the N-1-th vehicle was supposed to transmit the additional message, and
the different vehicle is not the N-1-th vehicle.

17. The communication system of claim 16, wherein the different vehicle is a leader vehicle of the platooning vehicles.

18. The communication system of claim 16, wherein the different vehicle is a vehicle that is physically closest to the N-1-th vehicle.

19. A communication system for platooning vehicles, the communication system comprising:
a plurality of controllers, each mounted in a separate platooning vehicle of the platooning vehicles,
wherein the plurality of controllers are each configured to:
obtain schedule information comprising a message transmission order for the platooning vehicles; and
transmit platooning vehicle messages based, at least in part, on the message transmission order, wherein a first controller of the plurality of controllers mounted in a first vehicle of the platooning vehicles is configured to:
  receive a message of the platooning vehicle messages from a second vehicle of the platooning vehicles;
  make a determination that, according to the message transmission order, the second vehicle was not scheduled to transmit the message before a separate message was received from a third vehicle of the platooning vehicles;
  receive the separate message from the third vehicle of the platooning vehicles when the message was scheduled to be received from the second vehicle according to the message transmission order; and
  update the message transmission order to obtain a new message schedule order based on receiving the message from the second vehicle before receiving the separate message from the third vehicle.

20. The communication system of claim 19, wherein the second vehicle is a leader vehicle, a physically closest vehicle to the third vehicle, or a next vehicle relative to the third vehicle in the message transmission order.

* * * * *

UNITED STATES PATENT AND TRADEMARK OFFICE
CERTIFICATE OF CORRECTION

PATENT NO. : 12,217,609 B2
APPLICATION NO. : 17/496551
DATED : February 4, 2025
INVENTOR(S) : Jang et al.

Page 1 of 1

It is certified that error appears in the above-identified patent and that said Letters Patent is hereby corrected as shown below:

On the Title Page

Item (73), in Column 1, in "Assignees", Line 1, delete "Corporation," and insert -- Company, --.

Signed and Sealed this
Eighteenth Day of March, 2025

Coke Morgan Stewart
*Acting Director of the United States Patent and Trademark Office*